Feb. 5, 1924.

R. H. TAYLOR 1,482,530

DENTIMETER

Filed Aug. 21, 1922

Inventor
Richardson H. Taylor.

By H. J. O'Brien
Attorney

Patented Feb. 5, 1924.

1,482,530

UNITED STATES PATENT OFFICE.

RICHARDSON H. TAYLOR, OF MEEKER, COLORADO.

DENTIMETER.

Application filed August 21, 1922. Serial No. 583,187.

*To all whom it may concern:*

Be it known that I, RICHARDSON H. TAYLOR, a citizen of the United States, residing at Meeker, in the county of Rio Blanco and State of Colorado, have invented certain new and useful Improvements in Dentimeters; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to an improved dentimeter and has special reference to the production of means whereby the circumference of teeth can be accurately and conveniently measured.

In dentistry it often becomes necessary to measure the distance around a tooth and also the height thereof, especially in crowning teeth.

I am aware that dentimeters have been made and sold and that some of these are capable of quite accurate work as far as obtaining the circumference of the teeth is concerned. The dentimeters with which I am familiar are objectionable for various reasons, which I do not consider that it is necessary to enumerate here.

It is the object of this invention to produce an instrument that will accurately and conveniently determine the circumference of a tooth and which does not require the wire thereof to be pried off from the tooth, as is the usual custom, but which permits the wire to be easily and quickly removed. It is a further object of this invention to produce a dentimeter by means of which the distance desired can be conveniently transferred to the gold plate. It is often necessary to obtain the measurement of the height of a tooth so as to be able to cut the gold plate the proper width, and it is my object to produce a dentimeter by means of which this can also be readily accomplished.

In order to more clearly describe my invention, I shall have reference to the accompanying drawing, in which—

The same reference characters will be used to designate the same parts throughout the several views.

Figure 1:
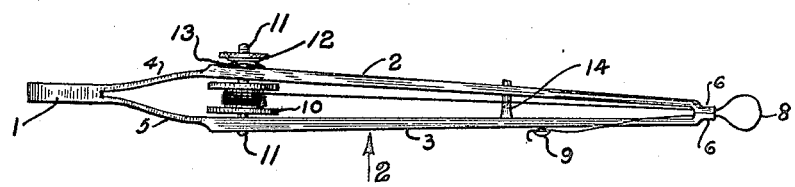
Fig. 1 shows a plan view of my improved dentimeter.
Figure 2:
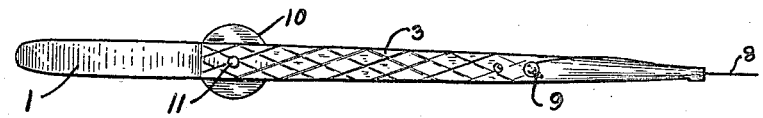
Fig. 2 shows a side elevation thereof.
Figure 3:
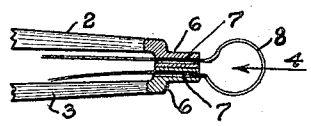
Fig. 3 shows a plan view, to an enlarged scale, of the tip of my instrument.
Figure 6:
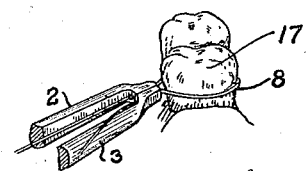
Fig. 6 shows my instrument in place for measuring the circumference of a tooth.
Figure 7:
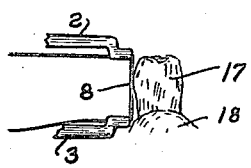
Fig. 7 shows how my instrument may be employed in measuring the height of a tooth.
Figure 8:
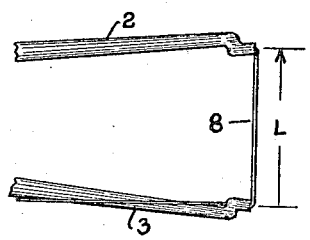
Fig. 8 shows the instrument opened after it has been employed as shown in Fig. 6.
Figure 9:
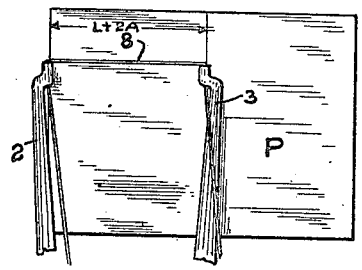
Fig. 9 shows how the measurement is transferred to the gold plate.

My instrument has the appearance of a pair of tweezers and has a handle portion 1, to which legs 2 and 3 are integrally connected by means of spring portions 4 and 5 in such a manner that they may be brought together into the position shown in Figs. 1, 3 and 6, or spread apart in the manner shown in Figs. 7, 8 and 9, the spring portions 4 and 5 being so tensioned that they tend to normally hold the legs 2 and 3 in the position shown in Fig. 1. The ends of the legs are offset as indicated by numeral 6, and holes 7 (Fig. 5) are drilled longitudinally through the offset portions for the reception of a wire 8. The end of the wire which passes through the hole in the end of leg 3 is brought to the outside and wrapped about the pin 9 so as to prevent it from slipping. The other end of the wire, which passes through the hole in the end of the leg 2, extends to the spool 10, which is provided with an axle 11 one end of which extends through a hole in the leg 3 and the other of which extends through a hole in leg 2. The end of the axle 11 which projects through leg 2 is threaded, and a nut 12 co-operates with it to clamp the spool in place. A spring washer 13 fits between the nut and the outer surface of leg 2. Leg 3 is provided with a pin 14, which projects through a co-operating opening in leg 2 and serves to hold the two legs steady when in closed position. The spool 10 contains a considerable length of soft wire, such as is usually employed in dentimeters, and this wire extends through the holes 7 to the pin 9 and can be formed into a loop like that shown in Fig. 1 or can be stretched out straight as shown in Figs. 7, 8 and 9. When the spool 10 is clamped in place by means of the nut 12, the wire will of course remain stationary with respect to the instrument, and advantage is taken of this in using the instrument as will hereinafter appear.

Figures 4, 5:
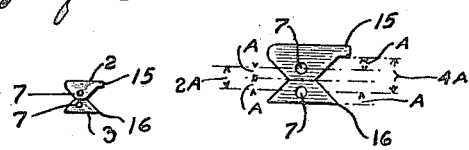
Fig. 4 shows an end elevation of the part shown in Fig. 3.
Fig. 5 is a view similar to that shown in Fig. 4, but to a greatly enlarged scale.

My instrument is employed in the following manner. When it is desired to obtain the circumference of a tooth for the purpose of cutting the gold plate from which a crown is made, the wire 8 is pulled out into the form of a loop in the manner shown in Fig. 1. This loop is then placed about the tooth and the jaws 2 and 3 closed in the manner shown in Fig. 6. The spool 10 is then rotated until all the slack in the wire is taken up, after which the nut 12 is tightened. When the spool 10 has been clamped by means of the nut 12, the legs are slightly moved apart and this loosens the wire about the tooth and permits the same to be removed therefrom without resorting to prying with instruments, as is customary where the wire is twisted together as with some dentimeters. After the instrument has been removed from the patient's mouth, the legs are spread apart until the wire becomes straight, as shown in Figs. 8 and 9. The wire 8, when straightened, will give the circumference of the tooth, with the exception of a certain minor error which I will now explain. Since the wire 8 passes through holes 7, which are always spaced apart a short distance, it is evident that the length of the wire forming the loop is somewhat less than the circumference of the tooth. This difference is approximately equal to the distance between the centers of the holes, or, as shown in Fig. 5, 2A, where A is the distance from the center of the hole 7 to the contacting surfaces of the legs. If we indicate the length of the wire forming the loop by the letter L (Fig. 8), it is evident that the circumference of the tooth is L+2A. In transferring the distance to the gold plate P, one of the instrument legs 2 is held so that it will slide along the edge of the plate, while the other makes a visible mark in the surface of the plate. In order to be able to conveniently mark off the actual circumference L+2A, I construct the tips of the instrument as follows. The ends of the tweezer's legs 2 and 3 are made of a cross section, which may be termed a truncated triangle, or a trapezoid, with the truncated portions thereof forming the contacting surfaces, all as shown in Fig. 5. One side of leg 2 is formed with an outwardly projecting portion 15, which is designed to engage the edge of the plate. The distance from the truncated edge to the center of the holes 7 is indicated by the letter A, and the distance between the two holes is therefore 2A. In order to obtain the proper circumference, the distance of 2A must be added to L for the reasons explained above, and in order to do this conveniently, the distance between the edge of the projecting portion 15 which engages the plate, and the marking edge 16, is 4A, and therefore the distance from the edge of the plate will be L+2A, as shown in Fig. 9. I do not maintain that the above is absolutely accurate, as some minor corrections may be necessary to compensate for the bending of the wire, but if we consider the wire to be a line having no appreciable diameter, it is believed that the above explanation is absolutely correct. The error in any event is too small to make any difference in the results desired, as absolute accuracy is not essential.

The instrument can also be employed to measure the height of a tooth in the manner perfectly obvious from an inspection of Fig. 7, in which the tooth is indicated by numeral 17 and the gums by numeral 18.

Although I have explained only two uses of my improved dentimeter, it can obviously be employed for other and specifically different uses, and I desire the above explanation of the instrument's use to be taken as illustrative only.

Having now described my invention, what I claim as new is:

1. A measuring instrument comprising, in combination, a body member having two relatively movable legs connected thereto at one end and having their other ends free, said legs having openings through their free ends adapted to receive a wire, and means for anchoring the ends of the wires.

2. A measuring instrument comprising, in combination, a body member having two relatively movable legs connected thereto at one end and having their other ends free, the free ends of said legs having a short portion thereof offset from the main portion of said legs, said offset portions being provided with holes, a wire connecting said ends and passing inwardly through said holes, a wire supply spool rotatably secured to one of said legs, and an anchoring pin secured to one of the said legs.

3. A measuring instrument comprising in combination a handle, a pair of comparatively rigid legs, a resilient portion connecting one end of each of said legs to said handle, a spool rotatably secured to one of said legs, means for clamping said spool against rotation, an anchoring pin on the other leg, the tips of the other ends of said legs having openings, and a wire having one end connected to said spool and the other to said anchoring pin, said wire extending through said openings.

4. A measuring instrument comprising in combination a handle, two relatively movable, comparatively rigid legs, resilient means connecting one end of each of said legs to said handle, the other ends of said legs being provided with openings, a wire having one end secured to each of said legs and extending through both of said openings, said ends having a truncated triangular cross section.

5. A measuring instrument comprising in combination a handle, two relatively movable, comparatively rigid legs, resilient means connecting one end of each of said legs to said handle, the other ends of said legs having openings, a wire having one end secured to each of said legs and extending through both of said openings, said legs having the end portions thereof laterally offset from the main portion of said legs, one of said ends having a projection adapted to slide along the edge of a metal plate and the other end having a marking edge.

In testimony whereof I affix my signature.

RICHARDSON H. TAYLOR.